United States Patent [19]
Araki et al.

[11] Patent Number: 4,870,744
[45] Date of Patent: Oct. 3, 1989

[54] TOOL EXCHANGE SYSTEM FOR MACHINING TOOLS

[75] Inventors: Hiroshi Araki; Hisao Ishii; Yoshihisa Akiyama; Hiroshi Kamada; Takashi Nagatomi, all of Tokyo, Japan

[73] Assignee: Fanuc Ltd., Minamitsuru, Japan

[21] Appl. No.: 204,430

[22] PCT Filed: Aug. 21, 1987

[86] PCT No.: PCT/JP87/00619
§ 371 Date: Jun. 16, 1988
§ 102(e) Date: Jun. 16, 1988

[87] PCT Pub. No.: WO88/01554
PCT Pub. Date: Mar. 10, 1988

[30] Foreign Application Priority Data
Sep. 1, 1986 [JP] Japan .................. 61-203803

[51] Int. Cl.⁴ .......................... B23Q 3/157
[52] U.S. Cl. ............................. 29/568
[58] Field of Search ....................... 29/568

[56] References Cited
U.S. PATENT DOCUMENTS

| | | | |
|---|---|---|---|
| 4,610,074 | 9/1986 | Katsube et al. | 29/568 |
| 4,679,296 | 7/1987 | Watanabe et al. | 29/568 |
| 4,745,673 | 5/1988 | Araki et al. | 29/568 |
| 4,827,600 | 5/1989 | Miyano | 408/35 X |

FOREIGN PATENT DOCUMENTS
58-24220  5/1983  Japan ......................... 29/568

Primary Examiner—Steven C. Bishop
Attorney, Agent, or Firm—Staas & Halsey

[57] ABSTRACT

In a tool exchange system, in which the selection of a tool (8) supported on a magazine (9) is done by the rotation of a main spindle (5) via a pair of gears (20) and (21), an elastic member (71) is provided so as to retain the magazine (9) in a machining position (pause position) which does not interfere with a machining operation. A first cam mechanism (11) is adapted to move the magazine (9) between a tool exchange position and the machining position in response to the vertical move of a Z-slider (3) moving along a column (1). A second cam mechanism (12) is adapted to operate a tool attachment-/removal means (6).

6 Claims, 8 Drawing Sheets

TOOL EXCHANGE SYSTEM FOR MACHINING TOOLS

BACKGROUND OF THE INVENTION

1. Field of the Invention

This invention relates to an improvement applicable to a tool exchange or replacement system for a machining tool. More specifically, this invention relates to an improvement applicable to a tool exchange or replacement system for a machining tool for the purpose of prohibiting any mutual disturbance from occurring between a work to be machined and any tool which is mounted on a magazine of the machine tool in the vicinity of the tool presently employed or between the work to be machined and any part of the machine tool, thereby an operator of the machine tool is given a wide space for operation of the machine tool.

2. Description of the Related Art

Presently available are a variety of tool exchange or replacement systems each of which has a magazine on which a plurality of tools are mounted to be selectively employed.

Figure 1:
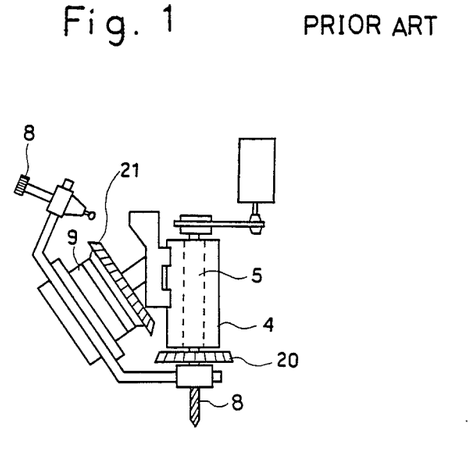
FIG. 1 is a schematic drawing of a tool exchange or replacement system for machine tools available in the prior art in the machining position (wherein a tool is clamped with a main spindle and unclamped from a magazine)
Figure 2:
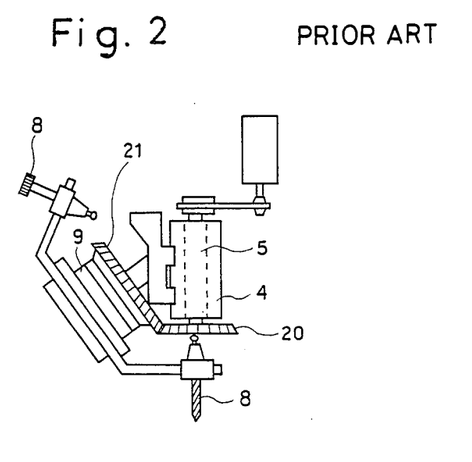
FIG. 2 is a schematic drawing of a tool exchange system for machine tools available in the prior art in the tool exchange or replacement position (wherein a tool is supported by a magazine and is not clamped with a main spindle but with a bevel gear)

The inventors of the present invention were successful in development of such a tool exchange or replacement system for machine tools as was mentioned above, and filed an application for patent (PCT/JP82/00367). FIGS. 1 and 2 show one embodiment of the above mentioned tool exchange or replacement system for machine tools, illustrated respectively in one position in which a tool 8 is coupled with a main spindle 5 and is kept apart from a magazine 9. Each piece of the bevel gears 20 and 21 is uncoupled from each other to allow machining and in the other position in which the tool 8 is not coupled with the main spindle 5 but is mounted on the magazine and each piece of the bevel gears 20 and 21 are coupled to each other to allow a tool to be exchanged or replaced by another.

Referring to the drawings, this tool exchange or replacement system developed by the inventors of this invention and which is available in the prior art, provides a piece of bevel gear 20 supported by the end of a main spindle 5 rotatably supported by a spindle head 4, a magazine 9 movable along the spindle head 4 in the vertical direction and which holds a plurality of tools 8, and the other piece of bevel gear 21 supported by the magazine 9 and which couples with the aforementioned piece of bevel gear 20 at the upper end position of the stroke of the spindle head 4.

After a machining operation finishes at the position illustrated in FIG. 1, the tool 8 employed for the finished machining is replaced by another tool 8, by unclamping the used tool 8 from the main spindle 5 by employing a tool attachment/removal means (not shown) such as a drawbar, etc, and by lifting the spindle head 4 which rotatably houses the main spindle 5 to the position illustrated in FIG. 2, with the magazine 9 remaining at the position illustrated in FIG. 1. This upward move of the spindle head 4 causes the used tool 8 which was already unclamped from the main spindle 5 during the aforementioned step, to be drawn out of the main spindle 5. The upward move of the spindle head 4, incidentally, causes the bevel gears 20 and 21 to be mutually coupled. Then, the main spindle 5 is rotated to rotate the bevel gears 20 and 21 which rotate the magazine 9, until another tool 8 which will be employed for the next machining operation meets the main spindle 5 during this rotation step. The tool 8 which was employed in the last machining operation moves to another position at which it does not meet the main spindle 5, before lowering the spindle head 4 along the magazine 9 until the aforementioned bevel gears 20 and 21 are uncoupled and the newly selected tool 8 is clamped with the main spindle 5 by employing the tool attachment/removal means (not shown), such as a drawbar, etc., to return to the machining position illustrated in FIG. 1.

At the machining position illustrated in FIG. 1, one of the tool holders of the magazine 9 stays close to the lower end of the main spindle 5. Since the tool holders of the magazine 9 are not connected with the main spindle 5, but surrounds the main spindle 5, however, the rotation of the main spindle 5 causes the tool 8 alone to rotate, readily allowing an operator of the machine tool to conduct various operation around the location close to the work (not shown) to be machined and the lower end of the main spindle 5 however, the tools 8 mounted on the tool holders (not shown) located adjacent to the tool holder facing the main spindle 5, causes some disturbance thereto.

The aforementioned tool exchange or replacement system needs no drive which is employed exclusively for exchanging or replacing tools, because a drive for driving a main spindle is employed also for rotating the magazine for indexing a tool. As a result, the structure thereof is simple and the tool exchange or replacement system is convenient particularly from the practical viewpoints.

The aforementioned tool exchange or replacement system which is illustrated in FIG. 1, allows one of the tool holders of the magazine to remain surrounding the lower end of the main spindle, resultantly disturbing the operator in his work in the neighborhood of the machining area. Further, some of the tool holders of the magazine located adjacent to the above mentioned one also disturbs the operator in his work in the vicinity of the machining area.

SUMMARY OF THE INVENTION

The object of this invention is to remove the aforementioned drawbacks and to provide a tool exchange or replacement system for machine tools having an advantage that an ample space is available for an operator thereof for his work in the machining area, in addition to an advantage that a rotation of a main spindle is utilized for replacement of a tool with another or for exchange of tools, removing the necessity to provide a drive which is employed exclusively for replacement of a tool with another or for exchange of tools.

To achieve the aforementioned object, a tool exchange or replacement system for machine tools in accordance with this invention is provided:

(a) a Z-slider slidable along a column, (b) a spindle head supported by the Z-slider and rotatably housing a main spindle and a tool attachment/removal means therein, (c) a magazine supporter rotatably supported by the column, and (d) a magazine supported by the magazine supporter and rotatably supporting an elastic tool grip for gripping a tool. Preferably, the device includes (a) an elastic member elastically maintaining the magazine supporter at a machining position (pause position), (b) a first cam mechanism having a function to rotate the magazine supporter against the elastic member, in response to the vertical move of the Z-slider and the spindle head, for the ultimate purpose to allow the elastic tool grip to shuttle between the tool exchange or replacement position and the machining position (pause position), (c) a second cam mechanism for causing a tool attachment/removal means to operate, in response to the vertical move of the Z-slider and which is provided a second cam arranged at the upper side of the column and a second lever driven by the second cam for driving the tool attachment/removal means, and (d) a pair of gears and of which the one gear is arranged on the magazine and of which the other gear is supported by the main spindle, the pair of gears and coupling at the upper stroke end of the spindle head.

Various structures are available to realize the first cam mechanism.

The first cam mechanism in accordance with a first embodiment is provided a first cam arranged on the Z-slider or the spindle held and a first lever supported by the column and driven by the first cam to rotate the magazine supporter and the magazine, resultantly causing an elastic tool grip rotatably supported by the magazine to shuttle between the machining position (pause position) and the tool exchange or replacement position.

The first cam mechanism in accordance with a second embodiment is provided a first cam arranged on the Z-slider and the magazine supporter rotatably supported by the column and which is driven by the first cam to rotate the magazine, resultantly functioning as the first lever for causing an elastic tool grip supported by the magazine to shuttle between the machining position (pause position) and the tool exchange or replacement position.

The first cam mechanism in accordance with third and fourth embodiments are respectively provided a first cam or arranged on the Z-slider and a first lever or supported by the column and which is driven by the first cam or to rotate the magazine, resultantly causing an elastic tool grip rotatably supported by the magazine to shuttle between the machining position (pause position) and the tool exchange or replacement position.

The structure of the tool exchange or replacement system for machine tools in accordance with this invention will be restated below.

The tool exchange or replacement system for machine tools in accordance with this invention is provided:

(a) an elastic member which elastically maintains a magazine supporter at the machining position (pause position) during the period wherein a first cam mechanism (which will be described later) does not operate, and (b) a first cam mechanism of which the function is to rotate the magazine supporter against the elastic member, in response to the vertical move of a Z-slider and a spindle head, resultantly shuttling the elastic tool grip between the tool exchange or replacement position and the pause position (machining position), and of which the structure is:

(i) In the case of a first embodiment, a combination of a first cam arranged on the Z-slider or the spindle head and a first lever driven by the first cam to rotate the magazine supporter and the magazine, resultantly causing an elastic tool grip rotatably supported by the magazine to shuttle between the machining position (pause position) and the tool exchange or replacement position, (ii) In the case of a second embodiment, a combination of a first cam arranged on the Z-slider and the magazine supporter rotatably supported by the column and which is driven by the first cam to rotate the magazine, resultantly functioning as the first lever for causing an elastic tool grip rotatably supported by the magazine to shuttle between the machining position (pause position) and the tool exchange or replacement position;

In the cases of the third or fourth embodiments, a combination of a first cam or arranged on the Z-slider and first lever or supported by the column and which is driven by the first cam to rotate the magazine, resultantly causing an elastic tool grip rotatably supported by the magazine to shuttle between the machining position (pause position) and the tool exchange or replacement position, (c) a second cam mechanism having the function to cause the tool attachment/removal means to operate, in response to the vertical move of the Z-slider, having a structure which is a combination of a second cam arranged at the upper side of the column and a second lever driven by the second cam to drive the tool attachment/removal means, and (d) a pair of gears and of which the one gear is arranged on the magazine and the other gear is supported by the main spindle and which couple to each other at the upper end of the stroke of the spindle head, (e) thereby an upward or downward move of the Z-slider causes the elastic tool grip to shuttle between the tool exchange or replacement position and the machining position (pause position), resultantly causing the elastic tool grip to be clamped or unclamped with the main spindle for allowing the tool exchange or replacement system for a machining tool to function.

BRIEF DESCRIPTION OF THE DRAWINGS

A more detailed description will be presented below for four independent embodiments of the tool exchange or replacement system for machine tools in accordance with this invention, referring to the drawings tabulated below.

DETAILED DESCRIPTION OF THE PREFERRED EMBODIMENTS

FIRST EMBODIMENT

Figure 3:
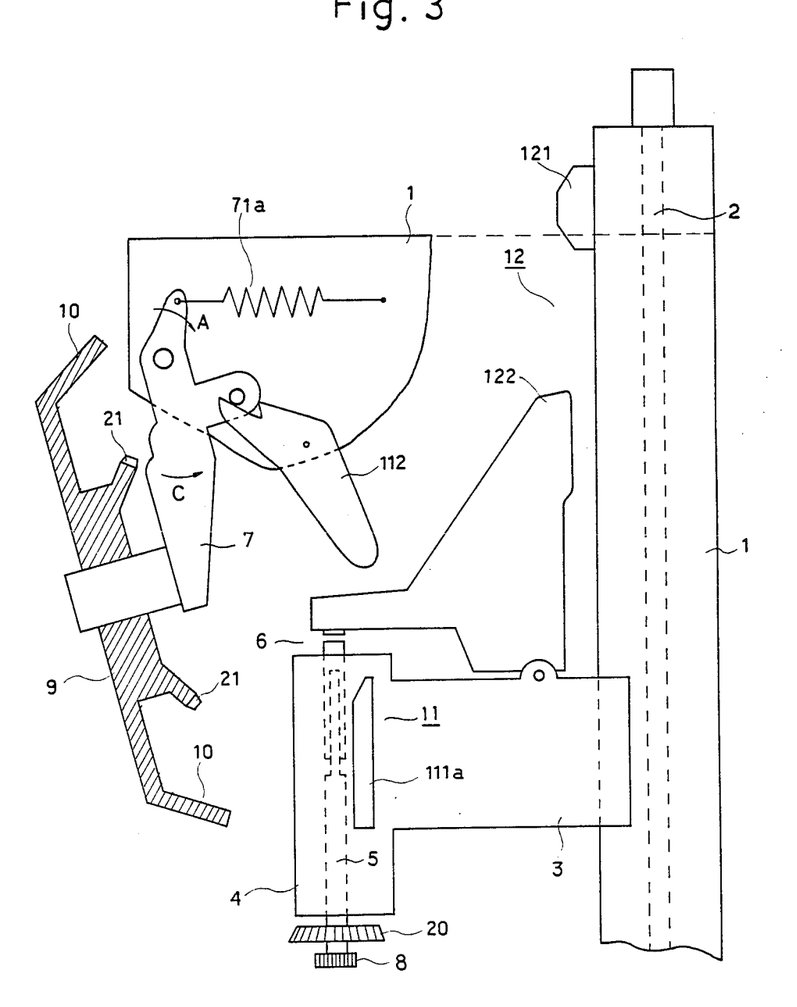
FIG. 3 is a schematic drawing of a tool exchange or replacement system for machine tools in accordance with the first embodiment of the present invention in the machining position (pause position)
Figure 4:
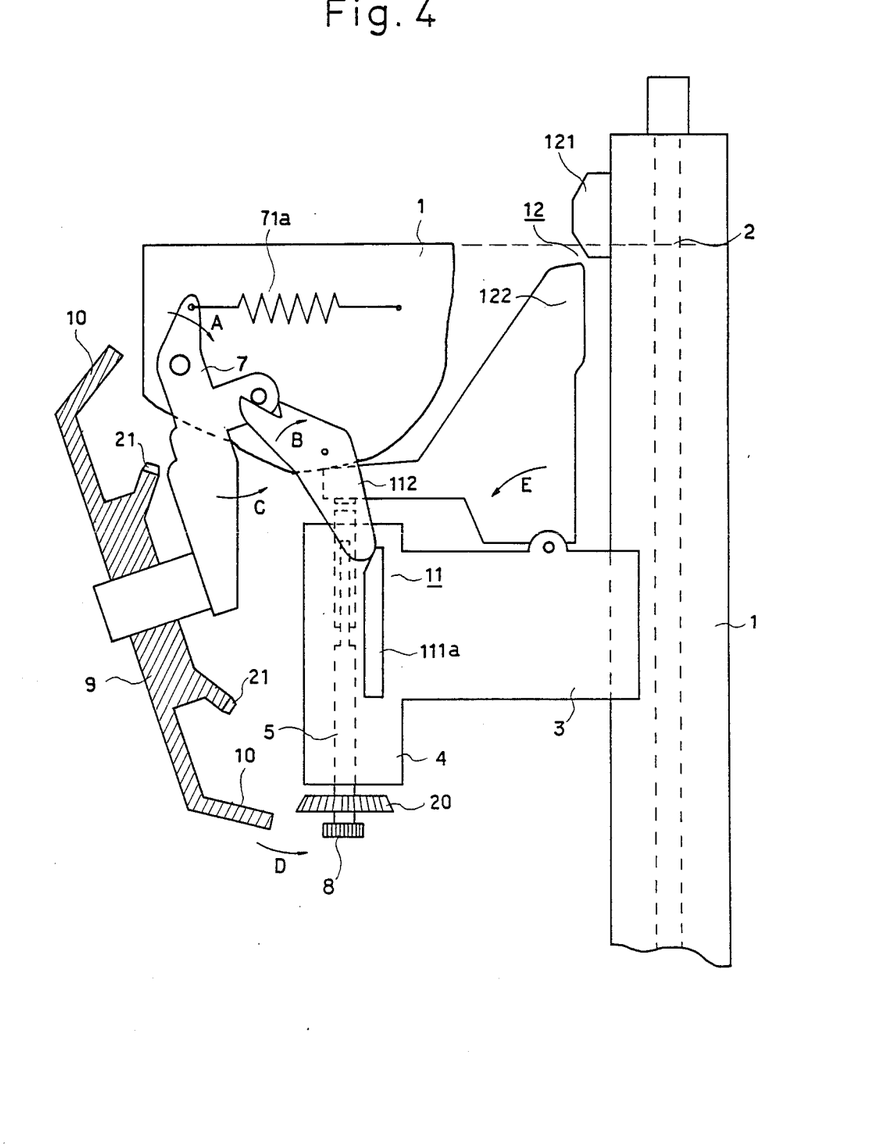
FIG. 4 is a schematic drawing of a tool exchange or replacement system for machine tools in accordance with the first embodiment of this invention in the position slightly in advance of the tool exchange or replacement position.
Figure 5:
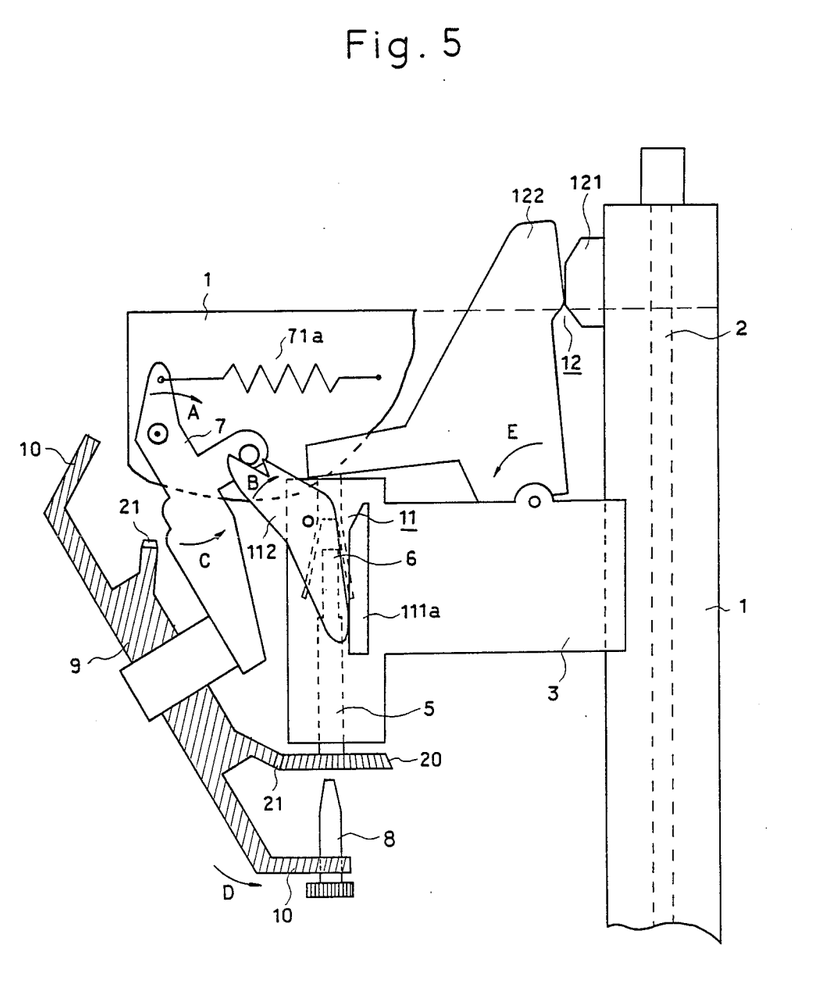
FIG. 5 is a schematic drawing of a tool exchange or replacement system for machine tools in accordance with the first embodiment of this invention in the tool exchange or replacement position.

Referring to FIG. 3 illustrating the machining position (pause position), FIG. 4 illustrating the medium position (the position slightly in advance of the tool exchange position), and FIG. 5 illustrating the tool exchange or replacement position, the numeral 1 designates a column. In the drawings, the column 1 is illustrated in two independent parts including a pillar which slidably supports a Z-slider 3 and another part which rotatably supports a first lever 112 of a first cam mechanism 11 and the magazine supporter 7. The column 1 houses a Z-shaft 2, rotatably supports the first lever 112 of the first cam mechanism 11 and the magazine supporter 7, and supports one end of a spring 71a which elastically maintains the magazine supporter 7 at the machining position (pause position) as illustrated in FIG. 3.

The numeral 3 designates a Z-slider, and is vertically movable along the Z-shaft 2. The numeral 4 designates a spindle head, and is supported by the Z-slider 3. The spindle head 4 rotatably houses a main spindle 5 and a tool attachment/removal means 6 such as a drawbar etc. (not shown) having a collet (not shown) at the end thereof. An exemplary function of the tool attachment-/removal means 6 is that a downward thrust applicable to the collet is effective to disconnect the tool 8 from the main spindle 5, although a collet connects a main spindle 5 and a tool 8 in an ordinary period.

The numeral 7 designates a magazine supporter, which is rotatable in the direction of arrow A or C. A spring 71a of which the one end is supported by the column 1 pulls one end of the magazine supporter 7 to rotate in the direction of the arrow A. Thus, unless a first cam mechanism 11 works, the magazine supporter 7 stays at the machining position (pause position) illustrated in FIG. 3. Referring to FIG. 4, an upward move of the Z-slider 3 causes the first lever 112 of the first cam mechanism 11 to rotate in the direction of an arrow B, resultantly rotating the magazine supporter 7 in the direction of the arrow C. This rotation of the magazine supporter 7 causes the elastic tool grip 10 to move in the direction of an arrow D into the tool exchange or replacement position from the machining position (pause position).

The magazine supporter 7 holds a magazine 9 and the elastic tool grip 10 supported by the magazine 9.

The numerals 20 and 21 designate bevel gears. One of the bevel gears 20 is supported by the end of the main spindle 5 and meshes with the other gears 21 at the tool exchange or replacement position, as shown in FIG. 5.

An elastic tool grip 10 is designed to grip the tool 8 with the force of a spring. Thus, the elastic tool grip 10 is allowed to grip or ungrip the tool 8 only by pushing the elastic tool grip 10 to an arbour (not shown) of the tool 8 or by pulling the elastic tool grip 10 from the arbour of the tool 8.

As will be described later, a second cam mechanism 12 works and the tool 8 is uncoupled from the main spindle 5 at the tool exchange or replacement position shown in FIG. 5. Thus, once the elastic tool grip 10 grips the tool 8, the first cam mechanism 11 ceases the function, and the elastic tool grip 10 stops the motion in the direction of the arrow D. However, the spindle head 4 continues the upward move until the bevel gears 20 and 21 mesh with each other, as shown in FIG. 5. During this upward move of the spindle head 4, the tool 8 is drawn out of the main spindle 5. At this location, a rotation of the main spindle 5 causes the magazine 9 to rotate and to replace the tool 8 with another tool 8.

After the tool 8 is replaced by another tool 8, the aforementioned steps are retraced in the reverse direction to return to the machining position (pause position).

The numerals 11 and 12 are the first and second cam mechanisms, which are imparted to the present invention.

The numeral 11 designates the first cam mechanism, which consists of a first cam 111a supported by the spindle head 4, a first lever 112 supported by the column 1 and driven by the first cam 111a to rotate the magazine supporter 7, and a magazine supporter 7 elastically pulled by the contractive spring 71a in the direction of the arrow A, thereby having a function to shuttle the magazine 9 and the elastic tool grip 10 between the tool exchange or replacement position (pause position) shown in FIG. 3.

The numeral 12 designates the second cam mechanism, which consists of a second cam 121 supported by the column 1, and the second lever 122 rotatably supported by the Z-slider 3.

Once the Z-slider 3 rises until the second lever 122 contacts the second cam 121, the second cam mechanism 12 works, and the second lever 122 rotates in the direction of an arrow E, resultantly causing the tool attachment/removal means 6 to unclamp the tool 8 from the main spindle 5. In other words, the second lever 122 causes the tool 8 to be uncoupled from the main spindle 5 by some means such as pushing down a drawbar (not shown) of the tool attachment/removal means 6 for unclamping a collet (not shown).

Figure 6:
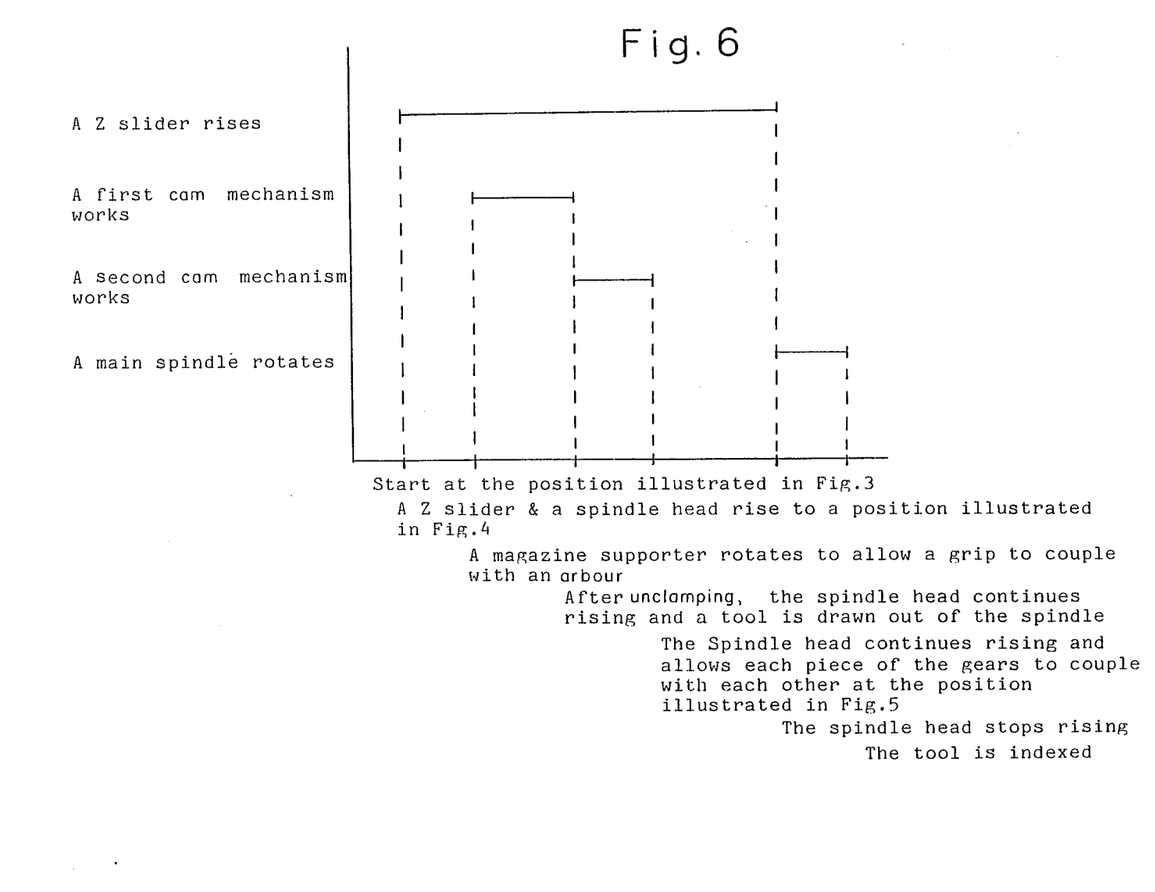
FIG. 6 is a time chart illustrating the operation of a tool exchange or replacement system for machine tools in accordance with the first embodiment of this invention.

Referring to FIG. 6 illustrating a time chart and to FIG. 3, the operation of a tool exchange or replacement system in accordance with the first embodiment of this invention will be described below.

When a machining finishes, the relative position of the magazine supporter 7, the magazine 9, the elastic tool grip 10 and the spindle head 4 is in the machining position (pause position) as shown in FIG. 3. In other words, during machining, the elastic tool grip 10 is not located in the machining area where the tool 8 is located but is located at a higher position, the operator being given a wide machining area during the machining period. At the position wherein a machining finishes as shown in FIG. 3, the magazine supporter 7 is pulled by the spring 71a in the direction of the arrow A and is located at the machining position (pause position). As a result, the elastic tool grip 10 grips no tool 8.

Referring to FIGS. 4 and 6, during a short period after the Z-slider 3 begins to rise from the position illustrated in FIG. 3, the Z-slider 3 and the spindle head 4 alone rise, and the magazine supporter 7 remains unmoved. During this period, the relative position of the magazine supporter 7, the magazine 9, the elastic tool grip 10 and the spindle head 4 changes from the position shown in Fig. 3 to the position shown in FIG. 4.

A contact of the first lever 112 with the first cam 111a causes the first lever 112 to rotate in the direction of the arrow B, allowing the first cam mechanism 11 to begin the operation. Namely, the magazine supporter 7 rotates against the spring 71a in the counterclockwise direction or in the direction of the arrow C, resultantly moving the elastic tool grip 10 in the direction of the arrow D until it arrives at the tool exchange or replacement position, where the elastic tool grip 10 is urged to the arbour of the tool 8 to be clamped thereto.

Unless the magazine 9 rotates after the tool 8 employed for the last machining, the tool 8 employed for this machining is returned to the same tool holder of the magazine at which the tool 8 was held earlier.

Referring to FIGS. 5 and 6, the Z-slider 3 and the spindle head 4 continue the rising. A contact of the second lever 122 with the second cam 121 causes the second cam mechanism 12 to operate, and the tool attachment/removal means 6 works to remove the tool 8 from the main spindle 5. Since the tool 8 has already been gripped, by the elastic tool grip 10 by this time, the tool 8 does not drop but is drawn out of the spindle, while it is held by the tool grip 10.

Although the first cam mechanism 11 has terminated the operation and the magazine 9 has ceased the rotation by this time, the Z-slider alone continues rising until the bevel gear 20 supported by the lower end of the spindle head 4 and the level gear 21 supported by the magazine 9 are coupled to each other. At this time, the Z-slider 3 stops rising.

Thereafter, the spindle 5 is rotated for the purpose of rotating the magazine 9 through the gears 20 and 21 and to bring another arbitrary tool 8 to the position facing the main spindle 5. This rotation of the magazine 9 causes the tool 8 employed for the last machining to be moved to another place, while being held in the rotated magazine 9.

The aforementioned steps have indexed arbitrarily another tool 8.

After a new tool 8 is indexed, the aforementioned steps can be retraced in the reverse direction to return to the machining position.

The Z-slider 3 is lowered from the position illustrated in FIG. 5 for uncoupling the gear 20 supported by the lower end of the spindle 5 from the gear 21 supported by the magazine 9 and finally for fixing the newly indexed tool 8 with the main spindle 5.

Although the first cam mechanism 11 and the second cam mechanism 12 work almost simultaneously, the second cam mechanism 12 works first, causing the tool attachment/removal means to fix the tool 8 to the main spindle 5. Thereafter, the first cam mechanism 11 works to cause the sequential moves described below. Namely, the magazine supporter 7 is rotated by the spring 71a in the clockwise direction or in the direction of the arrow A to remove the elastic tool grip 10 from the arbour of the tool 8, before the magazine supporter 7 and the elastic tool grip 10 are returned to the machining position (pause position) as shown in FIG. 3.

In the aforementioned manner, the first cam mechanism 11 finishes the operation. Thereafter, the spindle head 4 alone continues the downward travel until it arrives at the machining position (pause position).

SECOND EMBODIMENT

Figure 7:
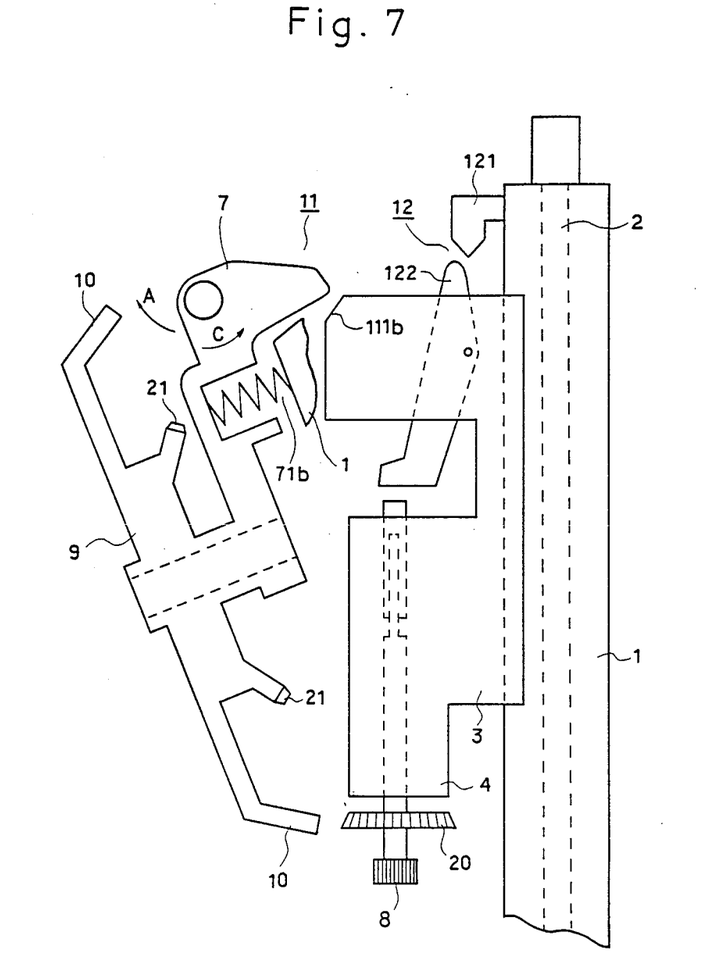
FIG. 7 is a schematic drawing of a tool exchange or replacement system for machine tools in accordance with the second embodiment of this invention (which is equivalent to FIG. 4 for the first embodiment)

Referring to FIG. 7, a first cam 111b is supported by Z-slider 3 at a position located above the spindle head 4. A spring 71b is arranged between the column 1 and the magazine supporter 7 with extensible tension of which the direction is illustrated by the arrow A. Similarly to that of the first embodiment, the function of this spring 71b is to maintain the magazine supporter 7 at the machining position (pause position), unless the first cam mechanism 11 works. To realize this required function, the spring 71b is a compressive spring (normally exerting a tension which elongates the spring to urge the magazine supporter 7 in the clockwise direction). When the first cam mechanism 11 works, the first cam 111b urges the magazine supporter 7 against the spring 71b in the counterclockwise direction or in the direction of the arrow C. As a result, the elastic tool grip 10 moves in the direction of the arrow D toward the tool exchange or replacement position. The other operation is quite similar to that of the first embodiment.

THIRD EMBODIMENT

Figure 8:
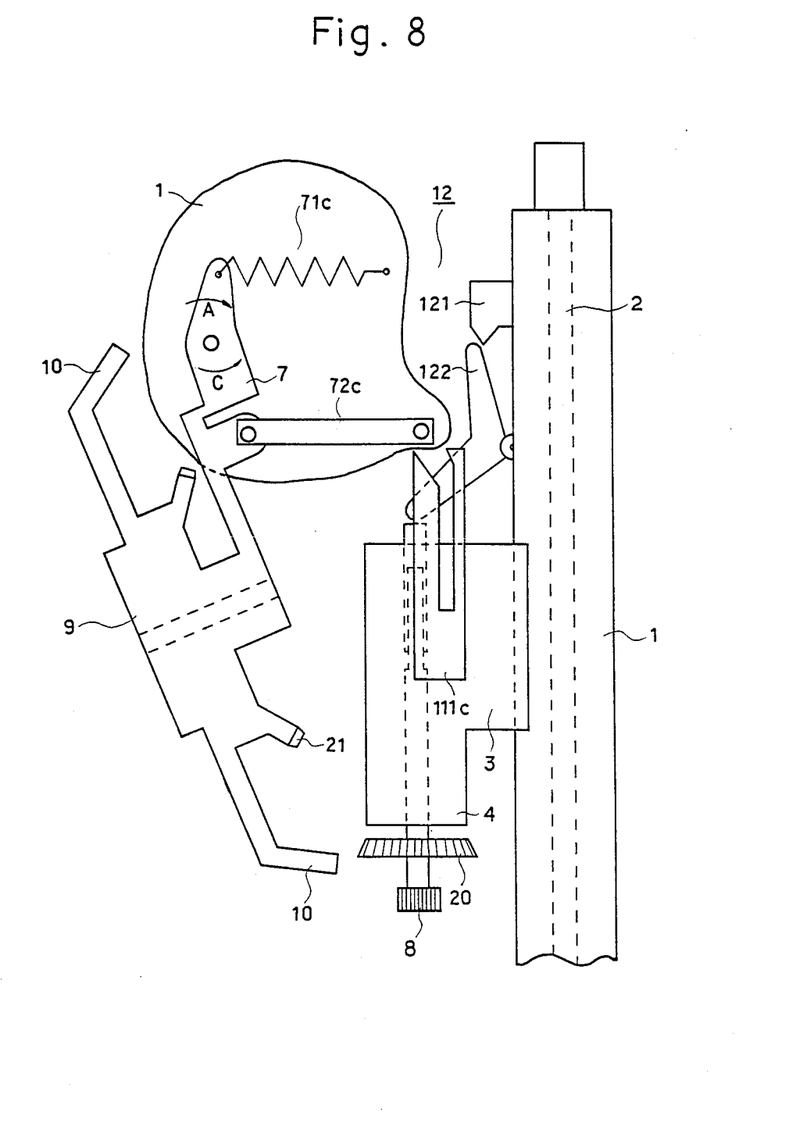
FIG. 8 is a schematic drawing of a tool exchange or replacement system for machine tools in accordance with the third embodiment of this invention (which is equivalent to FIG. 4 for the first embodiment)

Referring to FIG. 8, the difference between the third and fourth embodiments and the first and second embodiments is that the direction in which the first cam 111c or 111d moves in the case of the third or fourth embodiment is reverse to that in which the first cam 111a or 111b moves in the case of the first or second embodiment. In addition, an additional link 72c or 72d is arranged between the first cam 111c or 111d and the magazine supporter 7. The additional link 72c of the third embodiment is allowed exclusively a linear movement in the horizontal direction alone. The other operation is quite similar to that of the second embodiment.

FOURTH EMBODIMENT

Figure 9:
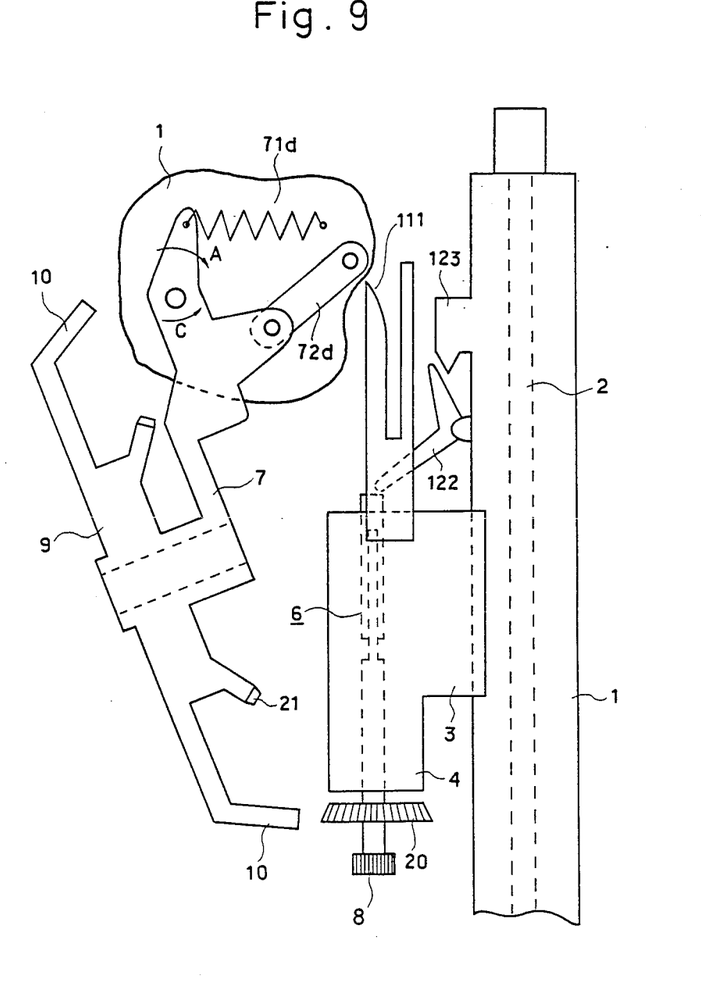
FIG. 9 is a schematic drawing of a tool exchange or replacement system for machine tools in accordance with the fourth embodiment of this invention (which is equivalent to FIG. 4 for the first embodiment).

Referring to FIG. 9, the difference between the fourth embodiment and the third embodiment is that the additional link 72d is of a rotary type in the case of the fourth embodiment, although that of the third embodiment is of a linear type.

The aforementioned description has clarified that this invention has successfully provided a tool exchange or replacement system for machine tools having various advantages including (i) an ample space is available in the machining area during the machining period in the machining position, because no disturbing parts are available in the machining area during the machining period, (ii) a vertical move of the Z-slider allows the elastic tool grip to shuttle between the machining position (pause position) and the tool exchange or replacement position, and (iii) a rotation of the main spindle conducted at the tool exchange or replacement position allows an indexing of an arbitrary tool.

Although this invention has been described with reference to specific embodiments, this description is not meant to be construed in a limiting sense. Various other embodiments and/or modifications of this invention will become apparent to persons skilled in the art upon reference to the description of this invention. It is therefore contemplated that the claim will cover any such embodiments and/or modifications as fall within the true scope of this invention.

What is claimed is:

1. A tool exchange system for machine tools comprising:
   a Z-slider slidable along a column,
   a spindle head carried by said Z-slider and rotatably housing a main spindle and tool attachment/removal means therein,
   a magazine supporter pivotally supported on said column,
   a magazine rotatably supported by said magazine supporter and having a plurality of elastic tool grips for selectively gripping a tool,
   a spring biasing said magazine supporter to a machining position,
   a first cam mechanism for pivoting said magazine supporter against said spring, in response to movement of said spindle head, thereby causing said elastic tool grip to shuttle between said machining position and a tool exchange or replacement position,
   a second cam mechanism for operating said tool attachment/removal means, in response to the vertical movement of said spindle head, and
   a pair of gears of which one gear is disposed on said magazine and of which the other gear is rotatably supported by said main spindle, said pair of gears being moved into meshing engagement at an upper limit of the movement of said spindle head, said magazine being rotatable by rotation of the main spindle when the magazine is in the tool exchange or replacement position.

2. A tool exchange system according to claim 1, wherein said spring is a tension spring and said first cam mechanism comprises a first lever pivotally connected to the column and a first cam provided on the Z-slider for moving the lever into abutment with the magazine supporter and thereby causing rotation of the magazine supporter.

3. A tool exchange system according to claim 1, wherein said second cam mechanism comprises a second cam provided on the column and a second lever pivotally connected to an upper end of the Z-slider, said second cam and said second lever being engaged with each other to cause the second lever to actuate the tool attachment/removal means when the spindle head is near the upper limit of its movement.

4. A tool exchange system according to claim 1, wherein the elastic member is rotatable by the main spindle rotating the pair of gears after the spindle head has reached its upper limit of movement whereupon the tool is released from the spindle head and held by the elastic member.

5. A tool exchange system according to claim 1, wherein said spring is a tension spring and said first cam mechanism comprises a first link having one end connected to the magazine supporter and the opposite and slidably receivable in a cam provided on the Z-slider.

6. A tool exchanger apparatus comprising:
   a spindle head having a spindle and being slidably mounted on a support column for vertical reciprocating movement;
   tool attachment/removal means disposed within the spindle head;
   a magazine having a support pivotally mounted adjacent the spindle head and being rotatably connected to the support;
   a plurality of elastic members disposed on the magazine at spaced intervals;
   a first cam mechanism having a first portion associated with the spindle head and a second complementary portion associated with the magazine, for pivoting the magazine supporter in response to vertical movement of the spindle head; and
   a second cam mechanism having a first portion associated with the spindle head and a second complementary portion associated with the support columns for actuating the tool attachment/removal means upon the spindle head attaining a predetermined height.

* * * * *

UNITED STATES PATENT AND TRADEMARK OFFICE
CERTIFICATE OF CORRECTION

PATENT NO.  : 4,870,744

DATED       : Oct. 3, 1989

INVENTOR(S) : Araki et al.

It is certified that error appears in the above-identified patent and that said Letters Patent is hereby corrected as shown below:

Col. 3, line 14, delete "and";
       line 16, delete "and";
       line 22, "held" should be --head--;
       line 39, delete --or-- (both occurrences).

Col. 4, line 11, ";" should be --.--;
       line 13, delete "a", and delete "or";
       line 14, delete "or";
       line 27, delete "and".

Signed and Sealed this

Second Day of October, 1990

Attest:

HARRY F. MANBECK, JR.

*Attesting Officer*          Commissioner of Patents and Trademarks